(12) United States Patent
Roche et al.

(10) Patent No.: US 6,760,834 B2
(45) Date of Patent: Jul. 6, 2004

(54) MICROPROCESSOR FOR SAVING CONTEXTUAL DATA WHEN SWITCHING TO A TEST PROGRAM

(75) Inventors: Franck Roche, Trets (FR); Thierry Bouquier, Aix en Provence (FR)

(73) Assignee: STMicroelectronics SA, Montrouge (FR)

(*) Notice: Subject to any disclaimer, the term of this patent is extended or adjusted under 35 U.S.C. 154(b) by 229 days.

(21) Appl. No.: 09/997,195

(22) Filed: Nov. 28, 2001

(65) Prior Publication Data
US 2002/0113535 A1 Aug. 22, 2002

(30) Foreign Application Priority Data
Nov. 29, 2000 (FR) .............................................. 00 15390

(51) Int. Cl.[7] .......................... G06F 9/44; G06F 11/25; G06F 11/34; G06F 9/445

(52) U.S. Cl. ...................... 712/202; 712/227; 712/229; 714/38; 714/39; 711/132; 717/124; 717/127; 717/131

(58) Field of Search ................................. 711/132, 125; 710/52; 712/42, 43, 202, 228, 229, 227, 31; 714/34, 38, 39, 36, 738; 717/124, 127, 128, 130, 131

(56) References Cited

U.S. PATENT DOCUMENTS

| 5,923,892 A | * | 7/1999 | Levy | 712/31 |
| 5,983,018 A | * | 11/1999 | Kanzaki | 714/34 |
| 6,002,869 A | * | 12/1999 | Hinckley | 714/35 |

FOREIGN PATENT DOCUMENTS

| EP | 0720087 | 7/1996 | G06F/7/00 |
| EP | 0992881 | 4/2000 | G06F/7/00 |

* cited by examiner

Primary Examiner—Daniel H. Pan
(74) Attorney, Agent, or Firm—Lisa K. Jorgenson; Allen, Dyer, Doppelt, Milbrath & Gilchrist, P.A.

(57) ABSTRACT

A microprocessor may be switchable between a normal mode and a test mode for performing a test program and may include a central processing unit (CPU) for saving contextual data in a stack of the microprocessor at the time of switching to the test mode. The CPU may deliver, at the beginning of the test program and on an input/output port, contextual data present in the stack beginning with the top of the stack. The CPU may also decrement a stack pointer by a value corresponding to a number of contextual data delivered.

27 Claims, 3 Drawing Sheets

MICROPROCESSOR FOR SAVING CONTEXTUAL DATA WHEN SWITCHING TO A TEST PROGRAM

FIELD OF THE INVENTION

The present invention relates to the field of electronic devices, and, more particularly, to microprocessors that may be switched to perform a test program. The present invention also relates to a method of managing the memory space of a microprocessor after switching the microprocessor to perform a test program, and the recording of contextual data into a stack.

BACKGROUND OF THE INVENTION

It is conventional to provide, in the memory of a microprocessor, a test program which allows control of the microprocessor to be taken over by external equipment (e.g., a test station) to check the operation of the microprocessor and/or debug an application program. To aid in further understanding, FIG. 1 schematically shows a microprocessor MP1 including a central processing unit CPU, a non-volatile program memory PMEM, a test memory TMEM, and a volatile memory RMEM. The memories PMEM, TMEM and RMEM are, for example, FLASH-, ROM- and RAM-type memories, respectively.

Memory TMEM receives a test program TST-PGR provided by the manufacturer, and memory PMEM receives an application program APL-PGR developed by the user. The RAM memory, provided for storing temporary data, receives the stack STK of the microprocessor. The stack STK occupies a non-extendible portion of the RAM delimited by a low address and a high address, which are typically noted in the specifications provided by the manufacturer, for example.

The CPU unit includes various registers, the content of which defines the "context" of the currently running application program. In particular, this may include: an accumulator register ACCU; a condition codes register CC including various flags such as a flag Z (Zero), flag N (Negative), flag C (Carry), flag H (Half-Carry), flag I (Interrupt Mask), etc; an index register X for the indexed addressing of the memory plane or the addressing of registers; a program counter PC including the address of the currently running instruction, generally including a most significant register PCh and a less significant register PCl; and a stack pointer SP (or stack indexing register) generally including a most significant register SPh and a less significant register SPl, and including the address of the top of the stack STK (i.e., the address of the first free location of the stack).

When the microprocessor switches into the test program while running the application program, the contextual data of the application program is saved in the stack STK to be restored at the end of the test session. A first memory area RZ1 must therefore be reserved in stack STK for saving the context. This area is provided for receiving the current value $A_0$ of the accumulator, the current value $CC_0$ of the condition code register, the current value $X_0$ of the index register, and the most significant bytes $PCh_0$ and the least significant bytes $PCl_0$ of the program counter PC.

On the other hand, when the microprocessor has switched to the test mode, the test program TST-PGR must itself have at its disposal an available area in the stack for the recording of data when running particular instructions. This data may include, for example, two bytes $PCh_T$, $PCl_T$ forming the return value of the program counter PC when running JUMP or CALL instructions. Thus, a second memory area RZ2 must be reserved in the stack STK for recording this data.

Further, the memory space to be reserved in the stack STK of such a microprocessor for providing switching to the test program includes the area RZ1 and the area RZ2. The location of this memory space is not defined and depends on the filling ratio of the stack at the time of switching. In practice, the user that develops an application must make sure that the application program never completely fills the stack, and that at least one free location is left at the top of the stack corresponding to the two above-mentioned areas.

For the user who wishes to best exploit the resources of the microprocessor when developing an application program, the areas RZ1, RZ2 to be reserved in the stack STK is memory space which cannot be used and, consequently, is a waste of the microprocessor's resources. However, the areas RZ1, RZ2 generally include only a relatively small number of bytes. Thus, the aforementioned problem may become particularly accute when using low cost microprocessors which include limited memory space and a limited size stack. Yet, many of the microprocessors currently in use in the home, automation, and automobile fields are indeed limited size, low cost microprocessors.

SUMMARY OF THE INVENTION

It is therefore an object of the present invention to provide a microprocessor that does not require the reservation, in the stack of the microprocessor, of the area RZ2 to be used by the test program.

This and other objects, features, and advantages of the present invention are provided by a microprocessor which may include means for switching into a test program, and means for saving contextual data in a stack of the microprocessor at the time of a switching into the test program. The microprocessor may further include means for delivering on an input/output port of the microprocessor contextual data present in the stack (starting with the top of the stack) at the beginning of a test session, and for decrementing a stack pointer by a value corresponding to the number of delivered contextual data.

More particularly, the microprocessor may include means for further delivering on the input/output port data present in a volatile memory of the microprocessor at the beginning of a test session. Further, the microprocessor may include means for delivering on the input/output port the content of at least one register likely to be modified during a test session at the beginning of a test session.

Additionally, the microprocessor may include means for performing a context restoration command. The context restoration command may include the recovery, via an input/output port, of the contextual data extracted from the stack at the beginning of a test session. It may also include recording this data in the stack and incrementing the stack pointer by a value corresponding to the number of contextual data recovered. Additionally, the means for performing a stack restoration command may also be arranged to recover other data extracted from the microprocessor after switching to the test program, and to record this data at its initial locations.

The present invention also relates to a method of managing the memory space of a microprocessor after switching the microprocessor to a test program and recording contextual data in a stack of the microprocessor. The method may include delivering, on an input/output port of the microprocessor, contextual data present in the stack starting with the top of the stack. Further, this data may be stored in external equipment, and the stack pointer may be decremented by a value corresponding to the number of contextual data delivered at the port.

More particularly, the method may also include delivering on the input/output port and storing in the external equipment data present in a volatile memory of the microprocessor. Further, the method may include delivering on the input/output port and storing in the external equipment the content of at least one register likely to be modified during a test session.

Additionally, the method may include performing context restoration when the microprocessor leaves the test program. The restoration may include recovering, via an input/output port, contextual data extracted from the stack at the time of switching to the test program, recording this data in the stack, and the incrementing the stack pointer by a value corresponding to the number of contextual data recovered. Moreover, the restoration may also include recovering other data extracted from the microprocessor after switching to the test program, and recording this data at initial locations thereof.

BRIEF DESCRIPTION OF THE DRAWINGS

These and other objects, characteristics and advantages of the present invention will become more apparent with reference to the following description of the method of the invention and a microprocessor according to the invention, given by way of non-limiting example, in conjunction with the accompanying drawings, in which.

DETAILED DESCRIPTION OF THE PREFERRED EMBODIMENTS

Figure 1:
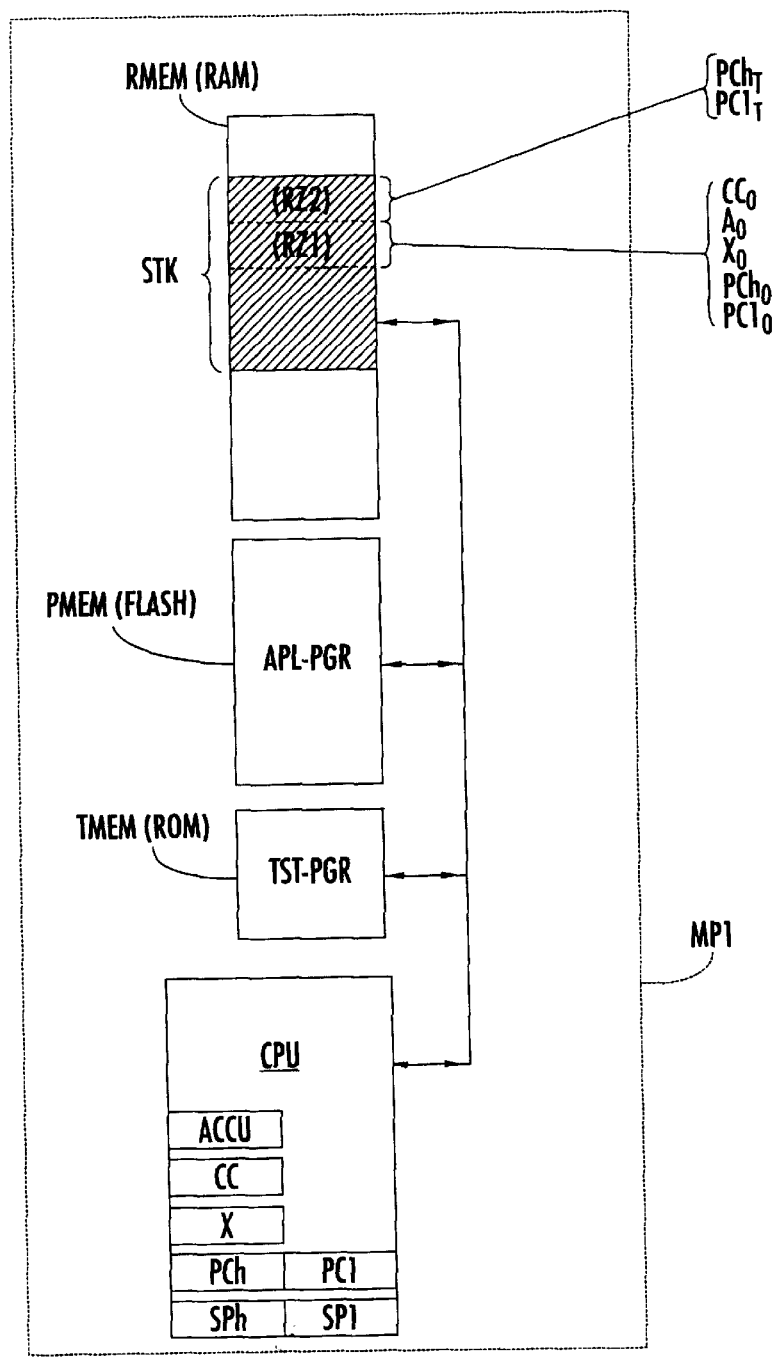
FIG. 1, previously described, is a schematic block diagram of the architecture of a conventional microprocessor according to the prior art.
Figure 2:
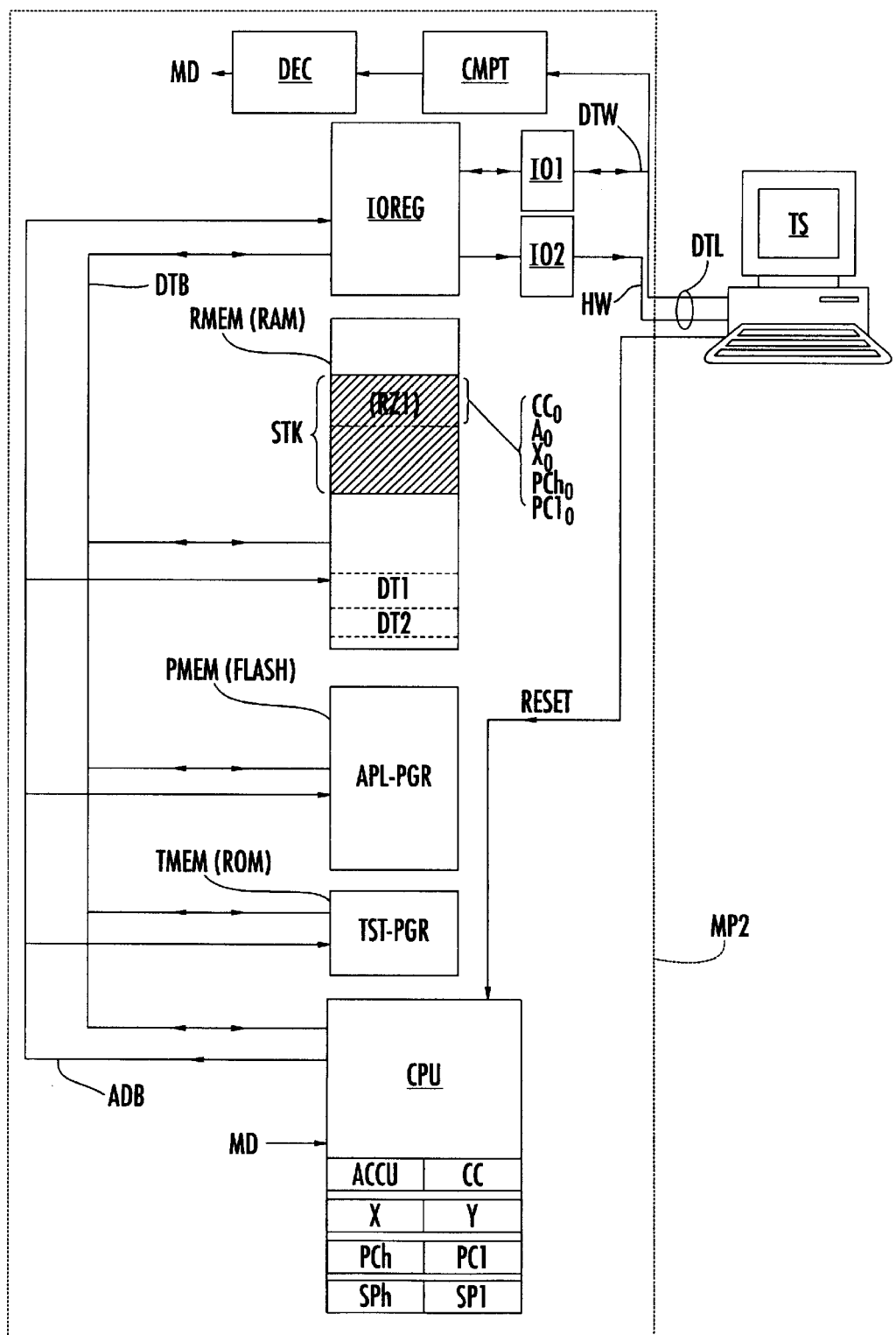
FIG. 2 is a schematic block diagram of a microprocessor according to the invention connected to a test station and also illustrating the implementation of a method of the invention.

A microprocessor MP2 according to the invention will now be described with reference to FIG. 2. The microprocessor may include a central processing unit CPU, a test (e.g., ROM) memory TMEM having a test program TST-PGR stored therein, a FLASH memory program PMEM receiving an application program APL-PGR, a volatile RAM memory RMEM including the stack STK of the microprocessor, and a register bank IOREG connected to input/output ports IO1, IO2. These various elements are connected to a data bus DTB as well as to an address bus ADB controlled by the CPU unit.

The CPU unit may include the conventional registers previously described above. For example, these registers may include an accumulator ACCU, a condition codes register CC, an index register X, a program counter PC including registers PCh, PCl, and a stack pointer SP including registers SPh and SPl. In some microprocessors, the CPU unit may also optionally include a second index register Y, which is illustratively shown in FIG. 2.

The microprocessor MP2 is coupled to a test station TS by a serial link DTL. The serial link DTL illustratively includes a data wire DTW and a clock wire HW respectively connected to the ports IO1 and IO2 of the microprocessor. The test station TS, which may be a microcomputer, for example, is provided to communicate with the microprocessor via the link DTL when the microprocessor switches to the test program.

Microprocessor MP2 may be distinguished from a conventional microprocessor by the fact that the area to be reserved in the stack STK in expectation of a switching into the test program only includes the area RZ1 described above. This area is for receiving the contextual data $CC_0$, $A_0$, $X_0$, $PCh_0$ and $PCl_0$. In other words, microprocessor MP2 does not require the area RZ2 described above to be reserved. This allows the test program to save values of the program counter PC when running JUMP or CALL instructions, for example.

According to the invention, the area RZ2 is dynamically allocated at the time of switching to the test program by an automatic context saving (ACS) sequence, which allows the freeing of a location usable by the test program in the stack. More particularly, after switching to the test program and loading the contextual data $CC_0$, $A_0$, $X_0$, $PCh_0$ and $PCl_0$ into the stack, the CPU unit reads the data $CC_0$, $A_0$ located at the top of stack STK. Further, the CPU also delivers this data on port IO1 via the register bank IOREG and then decrements the stack pointer SP by two units. This is so that the stack pointer SP points at a new top of the stack corresponding to the location of the data A0. The data CC0, A0 is received by the test station TS and is stored by the latter to be returned to the microprocessor at the end of the test session.

According to one aspect of the invention, the CPU unit also reads the data $Y_0$ present in register Y, as well as the data DT1, DT2 located at predetermined addresses of the RAM memory. This data is then delivered at port IO1 after having delivered the data $CC_0$ and $A_0$. This additional data is received and stored by the test station, and it will be returned later to the microprocessor.

It should be noted here that saving the data $Y_0$ allows the test program to manipulate register Y, and saving the data DT1, DT2 allows the test program to use the two freed memory locations. This characteristic of the invention, which is in addition to the above noted characteristic of extracting contextual data present in the stack, may be considered as optional and depends on the structure of the test program.

Figure 3A:
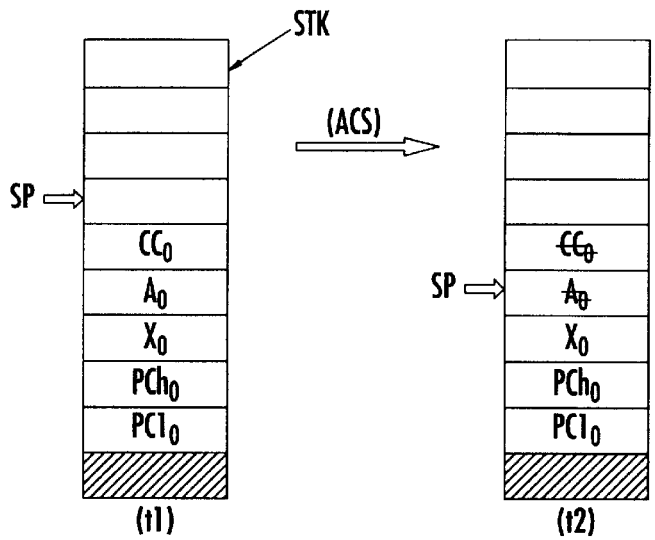
FIG. 3A is a schematic block diagram illustrating a step of the method of the invention occurring at the beginning of a test session.

Turning now to FIG. 3A, the effect of the ACS sequence on stack STK is illustratively shown. At a time t1, the microprocessor has switched to the test program and the stack includes the five bytes $CC_0$, $A_0$, $X_0$, $PCh_0$, $PCl_0$ which defines the context of the application program at the time of the switching. At a time t2, the CPU unit has decremented the stack pointer SP by two units after having read and delivered the data $CC_0$ and $A_0$ to the test station. Thus, the pointer SP indicates the former location of data A0 that now represents the top of the stack. The data $CC_0$ and $A_0$, although still present in the RAM memory, is no longer part of the stack.

Figure 3B:
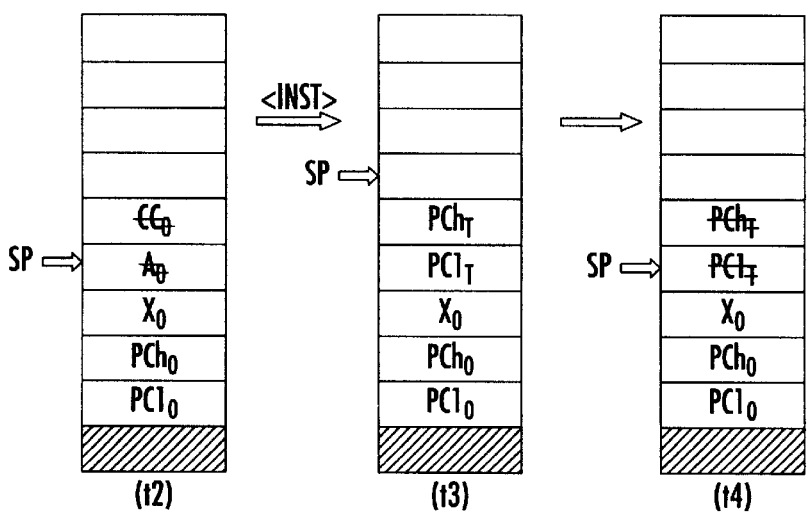
FIG. 3B is a schematic block diagram illustrating a manipulation operation of the stack of the microprocessor in the course of a test session.

Thus, as illustrated in FIG. 3B, this data is written over by the test program at a time t3 when running an instruction INST. For example, this may be a JUMP instruction requiring the current value $PCh_T$, $PCl_T$ of the program counter PC to be recorded in the stack. This operation is accompanied by an incrementation of stack pointer SP by two units. At a time t4, the test program returns to the JUMP start address and decrements the stack pointer SP by two units.

As a complement to these operations, the CPU unit is arranged for running, before leaving the test session, a data restoration command "GO_NC" ("Go New Context") sent by test station TS. This command is in the form of a series of bytes, the first of which is the command code:

| <GO_NC> | DT2 | DT1 | $Y_0$ | $A_0$ | $CC_0$ |
|---------|-----|-----|-------|-------|--------|

Figure 3C:
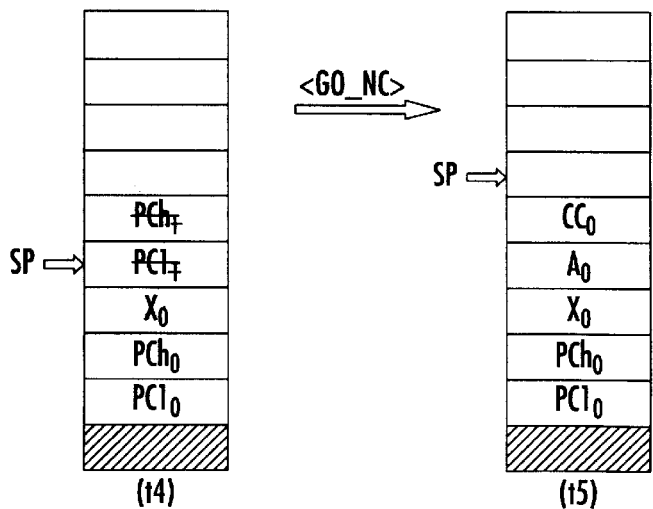
FIG. 3C is a schematic block diagram illustrating a step of the method of the invention occurring at the end of a test session.

In response to this command, the CPU unit restores the data DT1, DT2 and the value $Y_0$ of register Y, records the contextual data $A_0$ and $CC_0$ in the stack, and then increments the stack pointer by two units, as illustrated in FIG. 3C. Thus, at a time t5, the stack is in the same state as at time t1. Between the time t1 and the time t5, the test program is provided with an available space in the stack without requiring the reservation of the area RZ2, as in the prior art.

In practice, switching of the microprocessor to the test program may be accomplished in various ways. The microprocessor may include, for example, a counter CMPT, the input of which is coupled to the data wire DTW of the serial link, and the output of which delivers a counting value to the input of a decoder DEC. The output of the decoder delivers a mode signal MD applied to the CPU unit.

To make the microprocessor switch to the test program, the station TS first applies a reset signal (RESET) to the CPU unit. Then a predetermined number of electrical pulses are applied to the data wire DTW. At the end of this sequence, the counter CMPT delivers a number N corresponding to the number of pulses received. If the number N delivered by the counter is between two predetermined values N1 and N2, decoder DEC delivers to the CPU unit a mode signal MD indicating that the test program must be run. The unit then saves the context of the application program in the stack, and it is then self-connected to the test memory, which is often referred to as the "boot" memory by those skilled in the art.

To debug an application program, switching to the test program may also be caused by an interruption which is emitted when a predetermined event occurs. For example, this event may be the reading of a specific instruction inserted in the application program.

Those of skill in the art will appreciate that various alternative embodiments according to the present invention are possible. In particular, the number of contextual data extracted from the stack, the number of registers saved in the test station, and the number of locations freed in the RAM memory, for example, may all be modified in certain embodiments without departing from the scope of the present invention.

That which is claimed is:

1. A microprocessor comprising:
an input/output port;
a stack and a stack pointer associated with said stack;
means for switching the microprocessor to perform a test program;
means for saving contextual data in said stack upon switching to the test program; and
means for delivering contextual data from said stack to said input/output port starting with a top of said stack and based upon commencing the test program, and for decrementing said stack pointer by a value corresponding to a number of the contextual data delivered.

2. The microprocessor according to claim 1 further comprising a volatile memory and means for delivering data from said volatile memory to said input/output port based upon commencing the test program.

3. The microprocessor according to claim 1 further comprising at least one register having data stored therein to be modified during the test program, and means for delivering the data from said at least one register to said input/output port based upon commencing the test program.

4. The microprocessor according to claim 1 further comprising means for performing a context restoration command by recovering the contextual data delivered to said input/output port upon completion of the test program, storing the recovered contextual data in said stack, and incrementing said stack pointer by a value corresponding to a number of the contextual data recovered.

5. The microprocessor according to claim 4 further comprising at least one volatile memory and at least one register each having data stored therein to be delivered to said input/output port upon commencement of the test program; and wherein said means for performing a context restoration command also recovers the data delivered from said at least one volatile memory and said at least one register to said input/output port based upon commencement of the test program and stores the recovered data in respective initial locations thereof.

6. A microprocessor switchable between a normal operating mode and a test mode for performing a test program, the microprocessor comprising:
an input/output port;
a stack and a stack pointer associated with said stack; and
a central processing unit (CPU) for saving contextual data in said stack upon switching to the test mode, delivering contextual data from said stack to said input/output port starting with a top of said stack based upon commencing the test program, and decrementing said stack pointer by a value corresponding to a number of the contextual data delivered.

7. The microprocessor according to claim 6 further comprising a volatile memory, and wherein said CPU delivers data from said volatile memory to said input/output port upon commencing the test program.

8. The microprocessor according to claim 6 further comprising at least one register having data stored therein to be modified during the test program, and wherein said CPU delivers the data from said at least one register to said input/output port upon commencing the test program.

9. The microprocessor according to claim 6 wherein said CPU, responsive to a context restoration command, further recovers the contextual data delivered to said input/output port upon completion of the test program, stores the recovered contextual data in said stack, and increments said stack pointer by a value corresponding to a number of the contextual data recovered.

10. The microprocessor according to claim 9 further comprising at least one volatile memory and at least one register each having data stored therein to be delivered to said input/output port upon commencement of the test program; and wherein, responsive to the context restoration command, said CPU also recovers the data delivered from said at least one volatile memory and said at least one register to said input/output port upon commencement of the test program and stores the recovered data in respective initial locations thereof.

11. A microprocessor switchable between a normal operating mode and a test mode for performing a test program, the microprocessor comprising:
at least one port;
a stack and a stack pointer associated with said stack; and
a central processing unit (CPU) for saving contextual data in said stack upon switching to the test mode, delivering contextual data from said stack to said at least one port based upon commencing the test program, and decrementing said stack pointer by a value corresponding to a number of the contextual data delivered.

12. The microprocessor according to claim 11 further comprising a volatile memory, and wherein said CPU delivers data from said volatile memory to said at least one port upon commencing the test program.

13. The microprocessor according to claim 11 further comprising at least one register having data stored therein to be modified during the test program, and wherein said CPU delivers the data from said at least one register to said at least one port upon commencing the test program.

14. The microprocessor according to claim 11 wherein said CPU, responsive to a context restoration command, further recovers the contextual data delivered to said at least one port upon completion of the test program, stores the recovered contextual data in said stack, and increments said stack pointer by a value corresponding to a number of the contextual data recovered.

15. The microprocessor according to claim 14 further comprising at least one volatile memory and at least one register each having data stored therein to be delivered to said input/output port upon commencement of the test program; and wherein, responsive to the context restoration command, said CPU also recovers the data delivered from said at least one volatile memory and said at least one register to said at least one port upon commencement of the test program and stores the recovered data in respective initial locations thereof.

16. The microprocessor according to claim 11 wherein said at least one port comprises an input/output port.

17. The microprocessor according to claim 11 wherein said CPU delivers the contextual data from said stack to said at least one port starting with a top of said stack.

18. A method of managing memory space in a microprocessor upon switching the microprocessor to perform a test program and storing contextual data in a stack of the microprocessor, the method comprising:

delivering contextual data from the stack to an input/output port of the microprocessor starting with the top of the stack;

storing the contextual data delivered to the input/output port in an external storage device; and decrementing a stack pointer associated with the stack by a value corresponding to a number of the contextual data delivered to the input/output port.

19. The method according to claim 18 wherein the microprocessor comprises a volatile memory; and wherein the method further comprises delivering data from the volatile memory to the input/output port, and storing the data delivered from the volatile memory in the external storage device.

20. The method according to claim 18 wherein the microprocessor further comprises at least one register having data stored therein to be modified during the test program; and wherein the method further comprises delivering the data stored in the at least one register to the input/output port and storing the data delivered from the at least one register in the external storage device.

21. The method according to claim 18 further comprising restoring the contextual data upon completion of the test program by recovering the contextual data delivered to the input/output port upon commencement of the test program, storing the recovered contextual data in the stack, and incrementing the stack pointer by a value corresponding to a number of the contextual data recovered.

22. The method according to claim 21 wherein the microprocessor comprises at least one volatile memory and at least one register each having data stored therein to be delivered to the input/output port upon commencement of the test program; and wherein restoring the contextual data further comprises recovering the data delivered from the at least one volatile memory and the at least one register to the input/output port upon commencement of the test program, and storing the recovered data in respective initial locations thereof.

23. A method for managing memory space in a microprocessor switchable between a normal operating mode and a test mode for performing a test program, the microprocessor comprising at least one port, a stack, and a stack pointer associated with the stack, the method comprising:

saving contextual data in the stack upon switching to the test mode;

delivering contextual data from the stack to the at least one port upon commencing the test program; and decrementing the stack pointer by a value corresponding to a number of the contextual data delivered.

24. The method according to claim 23 wherein the microprocessor further comprises a volatile memory; and wherein the method further comprises delivering data from the volatile memory to the at least one port upon commencing the test program.

25. The method according to claim 23 wherein the microprocessor further comprises at least one register having data stored therein to be modified during the test program; and wherein the method further comprises delivering the data from the at least one register to the at least one port upon commencing the test program.

26. The method according to claim 23 further comprising:

recovering the contextual data delivered to the at least one port upon completion of the test program;

storing the recovered contextual data in the stack; and incrementing the stack pointer by a value corresponding to a number of the contextual data recovered.

27. The method according to claim 23 wherein delivering contextual data from the stack to the at least one port comprises delivering contextual data from the stack to the at least one port starting with a top of the stack.

* * * * *